(12) United States Patent
Krebs et al.

(10) Patent No.: US 12,105,791 B2
(45) Date of Patent: Oct. 1, 2024

(54) CLOUD KEY MANAGEMENT FOR SYSTEM MANAGEMENT

(71) Applicant: SAP SE, Walldorf (DE)

(72) Inventors: Rouven Krebs, Römerberg (DE); Jochen Wilhelm, Sandhausen (DE)

(73) Assignee: SAP SE, Walldorf (DE)

( * ) Notice: Subject to any disclaimer, the term of this patent is extended or adjusted under 35 U.S.C. 154(b) by 363 days.

(21) Appl. No.: 17/455,721

(22) Filed: Nov. 19, 2021

(65) Prior Publication Data

US 2023/0161864 A1    May 25, 2023

(51) Int. Cl.
G06F 21/45 (2013.01)
H04L 9/30 (2006.01)
H04L 9/32 (2006.01)
H04L 9/40 (2022.01)

(52) U.S. Cl.
CPC .......... *G06F 21/45* (2013.01); *H04L 9/30* (2013.01); *H04L 9/3226* (2013.01); *H04L 63/08* (2013.01)

(58) Field of Classification Search
CPC ......... G06F 21/45; H04L 9/30; H04L 9/3226; H04L 63/08
See application file for complete search history.

(56) References Cited

U.S. PATENT DOCUMENTS

| | | | |
|---|---|---|---|
| 8,108,327 B2 | 1/2012 | Krebs et al. | |
| 8,644,755 B2 | 2/2014 | Krebs et al. | |
| 9,386,007 B2 * | 7/2016 | Minov | H04L 63/062 |
| 9,584,588 B2 | 2/2017 | Mehta et al. | |
| 9,674,194 B1 * | 6/2017 | McClintock | H04L 63/12 |
| 9,760,847 B2 | 9/2017 | Krebs et al. | |
| 9,910,997 B1 | 3/2018 | Brail et al. | |
| 10,402,229 B2 | 9/2019 | Dimitrov et al. | |
| 10,637,888 B2 | 4/2020 | Krebs | |
| 10,671,723 B2 | 6/2020 | Krebs et al. | |

(Continued)

FOREIGN PATENT DOCUMENTS

WO    WO 2015127461    8/2015

OTHER PUBLICATIONS

NPL History Search (Year: 2023).*

(Continued)

*Primary Examiner* — Samson B Lemma
*Assistant Examiner* — Richard W Cruz-Franqui
(74) *Attorney, Agent, or Firm* — Fish & Richardson P.C.

(57) ABSTRACT

The present disclosure relates to computer-implemented methods, software, and systems for identifying potential attacks through monitoring of user credential login attempts across a network of websites. One example method includes receiving a request associated with an authentication of a requestor at a landscape environment. In response to receiving the request encrypted credentials responsive to the request are loaded at a credential manager running at the landscape environment. The encrypted credentials are persisted at a storage by the credential manager. The encrypted credentials include credentials that are encrypted with a public key and are provided in encrypted form to the credential manager. The encrypted credentials are provided to a credential usage component running at the landscape environment for decrypting the encrypted credential with a private key persisted by the credential usage component at the landscape environment.

18 Claims, 6 Drawing Sheets

(56) References Cited

U.S. PATENT DOCUMENTS

| | | | |
|---|---|---|---|
| 10,761,879 B2 | 9/2020 | Hoke et al. | |
| 10,768,900 B2 | 9/2020 | Krebs et al. | |
| 2008/0157969 A1* | 7/2008 | Beringer | G06Q 10/08 340/572.1 |
| 2010/0161965 A1* | 6/2010 | Solin | H04L 9/3268 713/182 |
| 2011/0211690 A1* | 9/2011 | Tu | H04L 9/0894 380/44 |
| 2011/0225420 A1* | 9/2011 | Eigler | G06F 21/57 713/176 |
| 2014/0082349 A1* | 3/2014 | Zarfoss, III | H04L 9/006 713/155 |
| 2014/0149568 A1* | 5/2014 | Kruempelmann | H04L 43/0817 709/224 |
| 2014/0359113 A1 | 12/2014 | Krebs et al. | |
| 2015/0089623 A1* | 3/2015 | Sondhi | H04L 63/205 726/9 |
| 2016/0277390 A1* | 9/2016 | Minov | H04L 63/0815 |
| 2017/0085381 A1* | 3/2017 | Richardson | H04L 9/0866 |
| 2017/0103226 A1* | 4/2017 | Eberlein | G06F 21/629 |
| 2018/0013549 A1* | 1/2018 | Block | H04L 9/3247 |
| 2018/0336571 A1* | 11/2018 | Gilani | H04L 67/10 |
| 2019/0042474 A1* | 2/2019 | Edirisooriya | G06F 3/0634 |
| 2019/0042737 A1 | 2/2019 | Krebs | |
| 2019/0050376 A1 | 2/2019 | Krebs et al. | |
| 2019/0238449 A1* | 8/2019 | Michael | H04L 45/123 |
| 2019/0268148 A1* | 8/2019 | Sun | H04L 9/302 |
| 2019/0394042 A1* | 12/2019 | Peddada | H04L 9/0894 |
| 2020/0186503 A1* | 6/2020 | Jahr | G06F 21/604 |
| 2020/0195500 A1* | 6/2020 | Kishen | G06F 9/45558 |
| 2020/0242231 A1* | 7/2020 | Neichev | H04L 63/0428 |
| 2021/0157731 A1 | 5/2021 | Krebs et al. | |

OTHER PUBLICATIONS

NPL Search History (Year: 2024).*
U.S. Appl. No. 16/912,870, Krebs et al., filed Jun. 26, 2020.
Extended European Search Report in European Appln. No. 22208118.4, dated Apr. 14, 2023, 14 pages.

* cited by examiner

CLOUD KEY MANAGEMENT FOR SYSTEM MANAGEMENT

TECHNICAL FIELD

The present disclosure relates to computer-implemented methods, software, and systems for data processing.

BACKGROUND

Software complexity is increasing and causes changes to lifecycle management and maintenance of software applications and platform systems. Software applications and systems can provide services and access to resources. Management of software applications and systems providing services to end-users, as well as providing resources to customers and end-users may be associated with security requirements for authorization of requests. Customers' needs are transforming, with increased requirements for flexibility and efficiency in terms of processes and landscape management.

SUMMARY

Implementations of the present disclosure are generally directed to computer-implemented method for credential management.

One example method may include operations such as: receiving a request associated with an authentication of a requestor at a landscape environment; and in response to receiving the request: loading, at a credential manager running at the landscape environment, encrypted credentials responsive to the request, wherein the encrypted credentials are persisted at a storage by the credential manager, wherein the encrypted credentials include credentials that are encrypted with a public key and are provided in encrypted form to the credential manager for use when requesting authentication at the landscape environment; and providing the encrypted credentials to a credential usage component running at the landscape environment for decrypting the encrypted credential with a private key, wherein the private key is persisted by the credential usage component at the landscape environment, and wherein the private key and the public key are an asymmetric key pair for authorizing requests.

In some instances, the example method can include that the received request is a request associated with the authentication of the requestor for executing an operation at a software system, wherein the request is received at a first trust zone of the landscape environment and the software system is running at a second trust zone of the landscape environment.

In some instances, the received request at the example method can be a request that is associated with the authentication of the requestor for executing an operation at a software system, wherein the credential usage component run at a first trust zone of the landscape environment, and wherein the credential manager runs at a second trust zone of the landscape environment that is separate from the first trust zone.

In some instances, the software system runs at the first trust zone of the landscape environment.

In some instances, the encrypted credentials can be decrypted at the credential usage components responsive to receiving the encrypted credentials from the credential manager, and wherein the decrypted credentials are provided by the credential usage component to a software system to authenticate an identity of the requestor.

In some instances, the example method can further include operations such as: in response to receiving the encrypted credential at the credential usage component, decrypting the encrypted credential with the private key; and transmitting a request to execute an operation at a software system, wherein the transmitted request includes decrypted credentials for authorization of an execution of an operation associated with the received request for authentication.

In some instances, the requestor can be authorized to execute an operation at a software system, and wherein the received request identifies the software system by referencing an internal identifier as a target context for performing authentication of the encrypted credentials.

In some instances, the credential manager can run as part of a cloud platform application to provide landscape management service for software systems, wherein the software systems run on cloud platform infrastructure at a first trust zone of the landscape environment.

In some instances, the credential manager and the credential usage component can run at separate isolated cloud platforms.

In some instances, the example method can further include: receiving instructions, at a user interface associated with the credential manager, to create the key pair including the public key and the private key; and in response to the received instructions, configuring the credential manager and the credential usage component to persist the public key and the private key correspondingly, wherein configuring comprises: providing the public key to be persisted by the credential manager; and providing the private key to be persistent at the credential usage component.

In some instances, the key pair can be associated with an account related to one or more managed systems, and wherein one or more users are associated with the account.

In some instances, the example method can include receiving, at a user interface associated with the credential manager, credentials provided by a user for accessing a software system from a plurality of systems associated with the credential manager; encrypting, at the user interface, the received credentials by using the private key that is persisted at the credential usage component; and providing the encrypted credentials to an cloud landscape manager for persisting the encrypted credential, wherein the cloud platform manager includes the credential manager and domain specific logic for configuring, managing, and persisting a platform landscape configuration for a platform landscape environment, wherein the platform landscape environment include software systems and is associated with one or more customer accounts, and wherein each customer account is associated with different credentials authorizing access to at least one of the software systems.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

The present disclosure describes various tools and techniques for credential management.

In some instances, customers manage and operate their software applications and systems that are hosted at different platform environments. For example, customers systems can be hosted at an account area (or platform space) defined for the customer at a cloud platform. The customers may use landscape management services provided by a service provided to managing the landscape (or environment) where the customer's applications and systems are running. Cloud computing is associated with development and management of networks of hybrid applications spanning among various environments and trust zones (e.g., platform spaces or environments that are in control of different owners). Different applications can be provided by different software providers and can provide different resources and/or services.

Landscape management is associated with providing support to customers that have their software applications and systems running at various platform environments (e.g., interconnected or isolated). In some instances, software applications and systems can be hosted at a public cloud platform environment. In some of those instances, multiple applications and systems associated with a customer can be hosted at a common cloud area of a cloud platform and can be managed based on services provided by a landscape management tool.

In some instances, a customer application and/or system may be coupled with other services and applications that are associated with landscape management services provided for the application and/or system to run properly (e.g., comply with requirements to serve requests to end users). For example, multiple entities of an application can be started to support higher demand from a given application to address high availability requirements for the application.

In some instances, communication between entities running at different trust zones and that implement different functionality provided by different providers and sources is associated with increased security concerns. Communication between different entities in a network of services and applications can be associated with risks of security breaches and a loss of control over confidential data. Access to customer landscape and systems can be associated with high security restrictions.

In some instances, a landscape management tool or a landscape management solution can be implemented and hosted as a Software-as-a-Service (SaaS) solution that can be communicatively coupled with the one or more platform environments where software applications and systems can be managed. In some instances, the landscape management tool may provide landscape management services to hosted software systems of a customer at a given cloud platform. In some instances, the landscape management tool can receive requests associated with managing software systems.

In some instances, the managed systems may be running at a trust zone of the customer that is different than the trust zone where the landscape management tool can be running. The managed applications and/or systems can be associated with authentication requirements for authenticating requests for execution of operations (or actions) requested by other applications and/or users.

In some instances, the landscape management tool can provide an interface for receiving requests to configure authentication rules for accessing a system from the managed systems in a secure manner. In some instances, the landscape management tool can be configured to provide credential management to support secure execution of requests at the managed system. The landscape management tool can store a protected version of credentials for authentication at the managed system that can be used when requesting operations or actions for execution. In some instances, the protected version of the credentials can be an encrypted version of credentials that can be received by the landscape management tool to be persisted. In some instances, credentials can be provided by a user having an account at the managed system. For example, the credentials can be related to authorizing access for certain operations for a user of a given user role, for a certain period of time, for a user group, or for a list of identifier user by their user identifier and/or name, among other examples.

In some instances, the landscape management tool can be configured to send instructions (or requests) to the managed systems to request execution of operations through an agent (e.g., an execution engine) that runs at a defined target environment. The agent can be hosted at a location that is at close proximity to the managed systems, for example, running within the platform space of the trust zone of the managed systems. In some instances, the landscape management tool may send instructions to request execution of an operation at a first system to the agent, where the instructions can include the protected version of the credentials to request authorization of the execution of the operation. The protected version of the credentials can be decrypted by the agent within the trusted environment of the managed system, and the decrypted credentials can be used to authenticate the request for the operations' execution.

In some instances, the landscape management tool can provide credential management logic to store credentials associated with different managed systems and different customers and/or users. For example, the landscape management tool may organize a storage of credentials that are identified based on a system identifier, user identifier, and/or user role identifier, among other examples. In some instances, once a request to execute an operation at a first system is received at the landscape management tool, the request can be evaluated to determine corresponding protected credentials (e.g., by loading credentials based on domain logic, by querying a credential storage, or other suitable examples).

In some instances, the landscape management tool can persist the encrypted credentials only in encrypted format without having a key to decrypt the credentials and without having access to the credentials in a decrypted format. In some instances, the determined protected credentials can be provided to an agent to decrypt the protected version of the credentials and to request authorization of execution of the requested operation according to the decrypted credentials. In some of those instances, the agent can be hosted at a trusted network zone of the requestor (e.g., a user or an application). The agent may have access to a persistence storage where private keys for decrypting corresponding encrypted credentials can be maintained.

In some instances, the agent can be configured to store relevant private keys for associated managed systems, and can thus be able to decrypt received encrypted credential on demand. In some instances, the encrypted credentials are decrypted upon receipt of the request for execution of operations at the managed systems, when the request includes the encrypted credentials. In those instances, the agent can store logic for decrypting credentials without storing the credentials themselves or the credentials in encrypted format, and the landscape management tool can store the credentials but only in encrypted format. In some instances, the configuration of processing requests and determining credentials to authorize requests at managed systems based on landscape management logic for executing requests can be associated with multiple advantages. For example, separation of the storage of decryption keys and encrypted credentials can provide improved security and flexibility.

In some instances, credentials to authenticate a request at a managed system can be provided by a user and can be encrypted with a public key, where the encrypted credentials can be stored at a landscape management tool (or at a storage associated with the tool) to persist credential information. A private key that corresponds to the public key to form a key pair (e.g., an asymmetric key pair) can be stored at the agent. The agent can request the execution of the operation at a trust zone of the managed system. Thus, the private and the public key can be stored at separate location, and the encrypted credentials can be stored together with the public key at a storage location managed by the landscape management tool.

In some instances, the configurations of the landscape management tool and the agent can ensure that the credentials (e.g., as private protected data) can be decrypted by an owner or possessor of the decryption key in a context of a concrete usage scenario for invoking a given operation at a managed system. Since the possessor of the private key does not have general access to the credentials but upon request to use the credentials as provided by the landscape management tool, the risks of security attacks and credential leakage are reduced. In those instances, the landscape management tool has no access to the private key to decrypt the encrypted credentials and is unable to use the credentials in decrypted form, and thus provides them in encrypted form to a credential usage component. Therefore, security breaches at the landscape management tool may be associated with a lower risk of execution of unauthorized operation at the managed systems.

In some instances, the private key can be persisted together with non-confidential data in a semantically useful context without unnecessarily increased complexity of the implementation of the agent. That organization can be associated with increased consistency and reduced complexity of the implementation of the logic of the agent.

Figure 1:
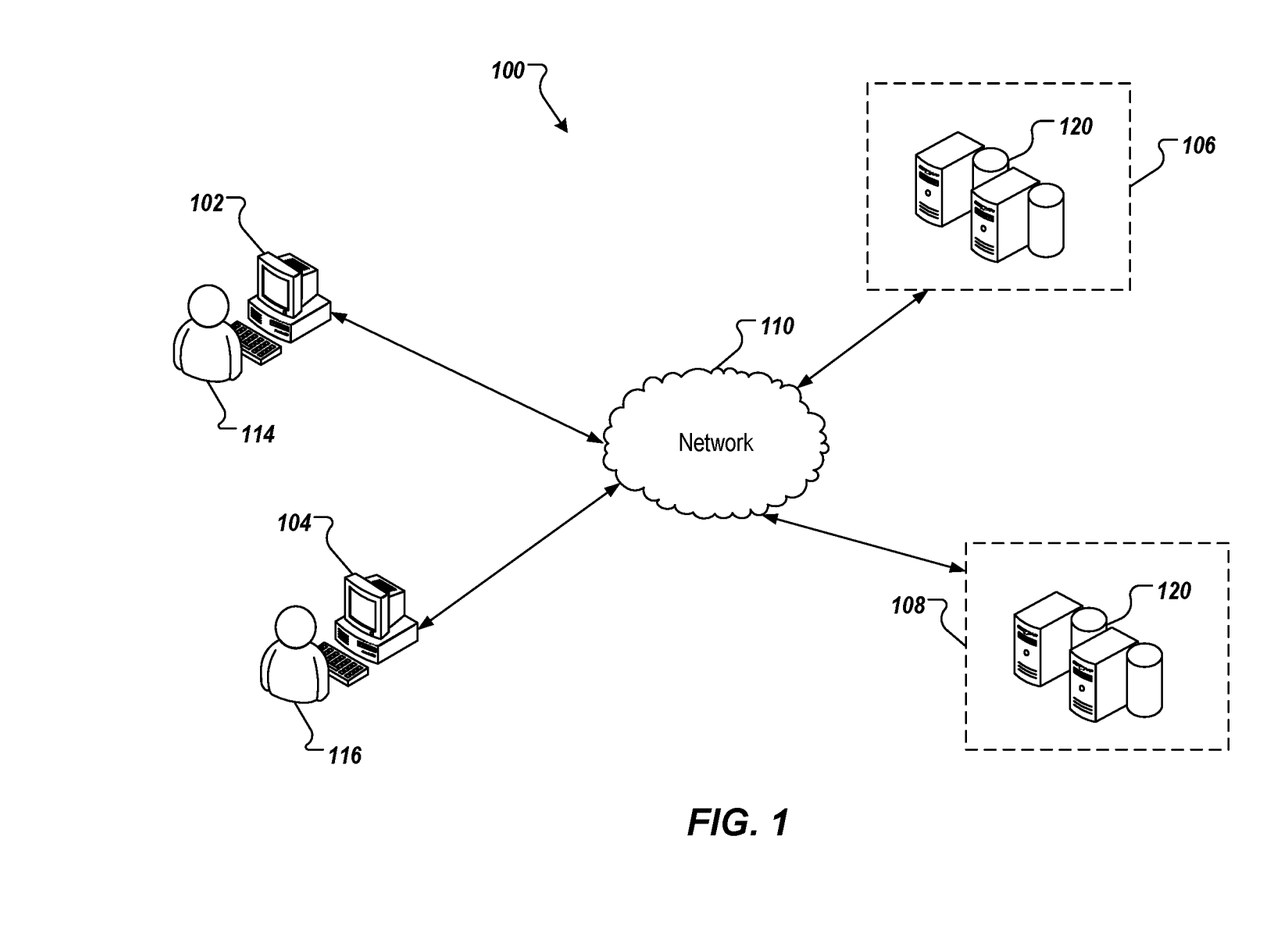
FIG. 1 depicts an example system that can execute implementations of the present disclosure.

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on VMs hosted on cloud infrastructure. In some instances, one application and/or service can run as multiple application instances on multiple corresponding VMs, where each instance is running on a corresponding VM.

Figure 2:
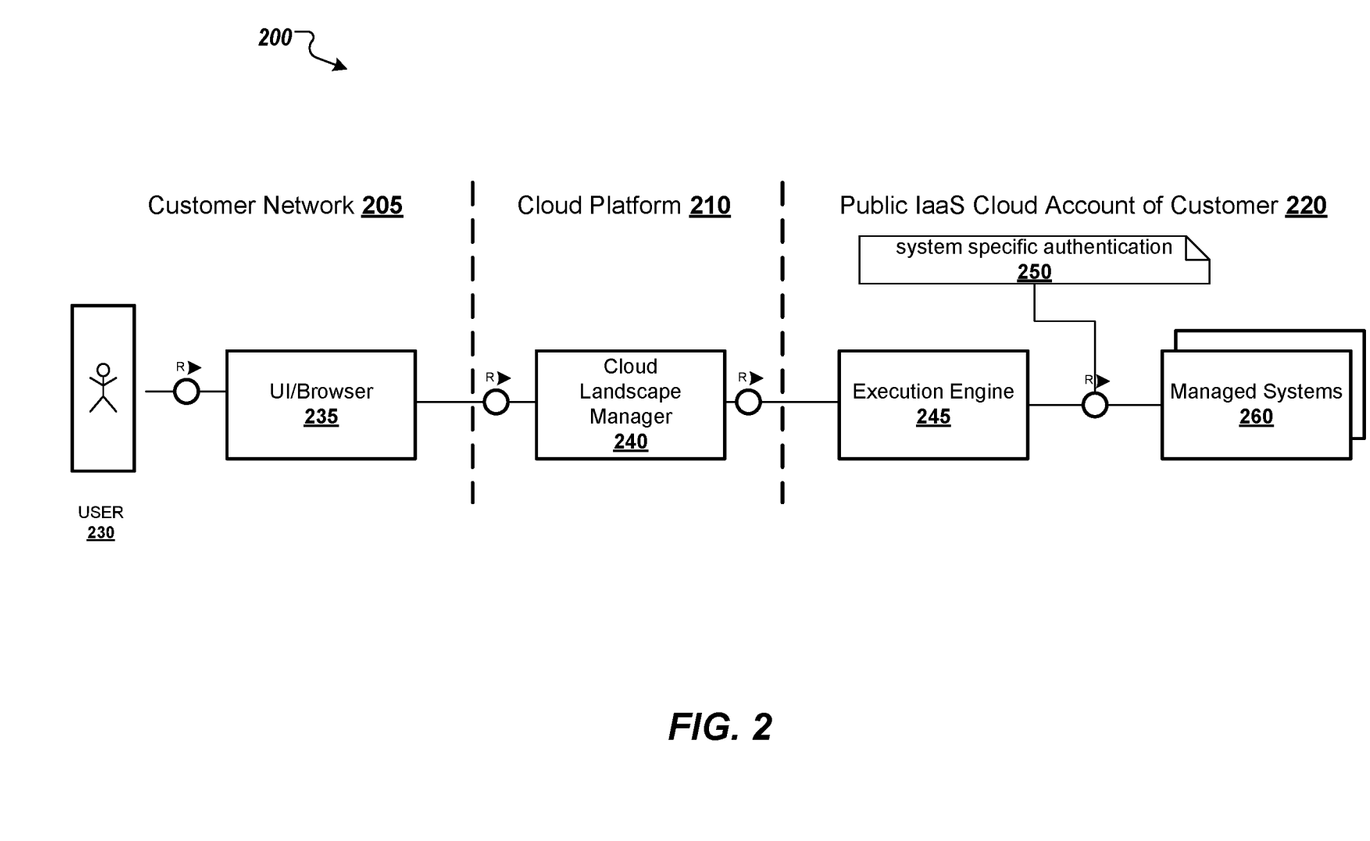
FIG. 2 is a system diagram of an example system including a landscape environment configured to manage credentials in a secure manner in accordance with implementations of the present disclosure.

FIG. 2 is a system diagram of an example system including a landscape environment 200 configured to manage credentials in a secure manner in accordance with implementations of the present disclosure.

In some instances, the landscape environment 200 includes a customer network 205, a cloud platform 210, and a public Infrastructure-as-a-Service (IaaS) Cloud account 220 as separate network segments that can be managed by different entities. In some instances, a customer can deploy, start, and manage software applications and systems at the public IaaS cloud account 220 based on landscape management services provided by a cloud landscape manager 240 hosted at the cloud platform 210. The cloud landscape manager 240 can receive requests initiated through a user interface (UI) application and/or a browser 235 running at a computing device connected to the customer network 205 and directed to actions and/or operations to be performed to one or more systems running at the public IaaS cloud account 220. For example, a user (e.g., an administrator) 230 can request through a mobile portable device connected to the customer network 205 to start or stop a running application at the public IaaS cloud account 220 of the customer by sending a request for executing the operation at the cloud landscape manager 240.

In some instances, the customer network 205 is managed according to customer network requirements defined for the customer, and can be considered a trust zone for the customer. For example, applications, such a UI application or browser 235, of the customer can be hosted at the customer network 205 as a secure environment for requesting operations in association with cloud based applications and systems of the customer (e.g., managed systems 260). In some instances, the customer network 205 and the public IaaS cloud account 220 of the customer can be part of a first trust zone of the landscape environment 200.

In some instances, the customer can have associated managed systems 260 running at a public IaaS cloud account 220. The Public IaaS cloud account 220 provides cloud platform resources for hosting and running software applications and systems that are managed by the customer associated with the customer network 205.

In some instances, the cloud platform 210 part of the landscape environment 200 can be considered a second trust zone where a cloud landscape manager 240 is hosted, where the second trust zone is different from the trust zone managed by a software provided of the cloud landscape manager 240. The cloud landscape manager 240 can provides services to systems including the managed systems 260 running at the public IaaS cloud account 220. In some instances, the provided services by the cloud landscape manager 240 can be associated with performing system management tasks at the managed systems 260.

In some instances, an end user 230 can trigger execution of operations in the landscape environment 200 through a UI application or a browser 235. The UI/Browser 235 can communicate with the cloud landscape manager 240. In some instances, the cloud landscape manager 240 implements backend services that are actual domain logic and functionality to compose various atomic operations into an overall higher granularity operation, such as a workflow. The implemented domain logic at the cloud landscape manager 240 can support flexible execution of different management processes.

In some instances, the cloud landscape manager 240 may request execution of an operation at a system of the managed systems 260 through an agent such as an execution engine 245. The cloud landscape manager 240 may be a landscape management tool, as previously discussed. The cloud landscape manager 240 can store encrypted credentials associated with systems including the managed systems 260. In some instances, the credentials can be provided by the end user 230 to the UT/Brower 235 and can be encrypted with a public key and provided in encrypted form to the cloud landscape manager 240. The cloud landscape manager 240 may communicate with the execution engine 245 to request that the execution engine 245 request the execution of the operations based on authorization according to provided encrypted credentials. In some instances, the execution engine 245 can be called to facilitate the communication with the managed system to execute the operation. In some instances, the execution engine 245 runs at the first trust zone of the customer and may perform direct communication with the managed system bypassing firewall configurations that can exist between different trust zones (e.g., between the first trust zone of the managed system and the second trust zone of the cloud platform 210). In some more instances, the customer network 205 and the public IaaS Cloud account 220 can be part of a single trust zone, or can be separate trust zones. In those instances, the landscape environment 200 includes three trust zones corresponding to the customer network 205, the cloud platform 210, and the public IaaS cloud account 220.

In some instances, the execution engine 245 may store a decryption key to decrypt the provided encrypted credentials, and to use the decryption key for authorizing the execution of the operation requested at the managed system. In some instances, the execution engine 245 is implemented as a light engine that includes limited implemented logic with reduced complexity to reduce interruptions of the execution due to maintenance actions (e.g., updates). In some instances, the execution engine 245 is deployed at the public IaaS cloud account of the customer to support secure execution of landscape management operations.

In some instances, the execution engine 245 receives instructions to perform requests based on logic implemented at the cloud landscape manager 240. The cloud landscape manager 240 implements logic for the configuration of the landscape environment 200. In some instances, the implemented configuration may include hostnames, IP addresses, system structures, and passwords, among other potential confidential data relevant for the management of the landscape.

In some instances, the cloud landscape manager 240 persists domain logic together with associated credentials closely together to keep an association between the logic and the relevant credentials. In some instances, by keeping an association between the domain logic and the credentials, the cloud landscape manager 240 can be implemented with reduced complexity and without relying on a reference to a separate secure storage.

In some instances, the managed systems 260 are associated with system-specific authentications 250 that are defined per system and includes authentication requirements for execution different operations (e.g., authentication models, metadata, rules, etc.).

Figure 3:
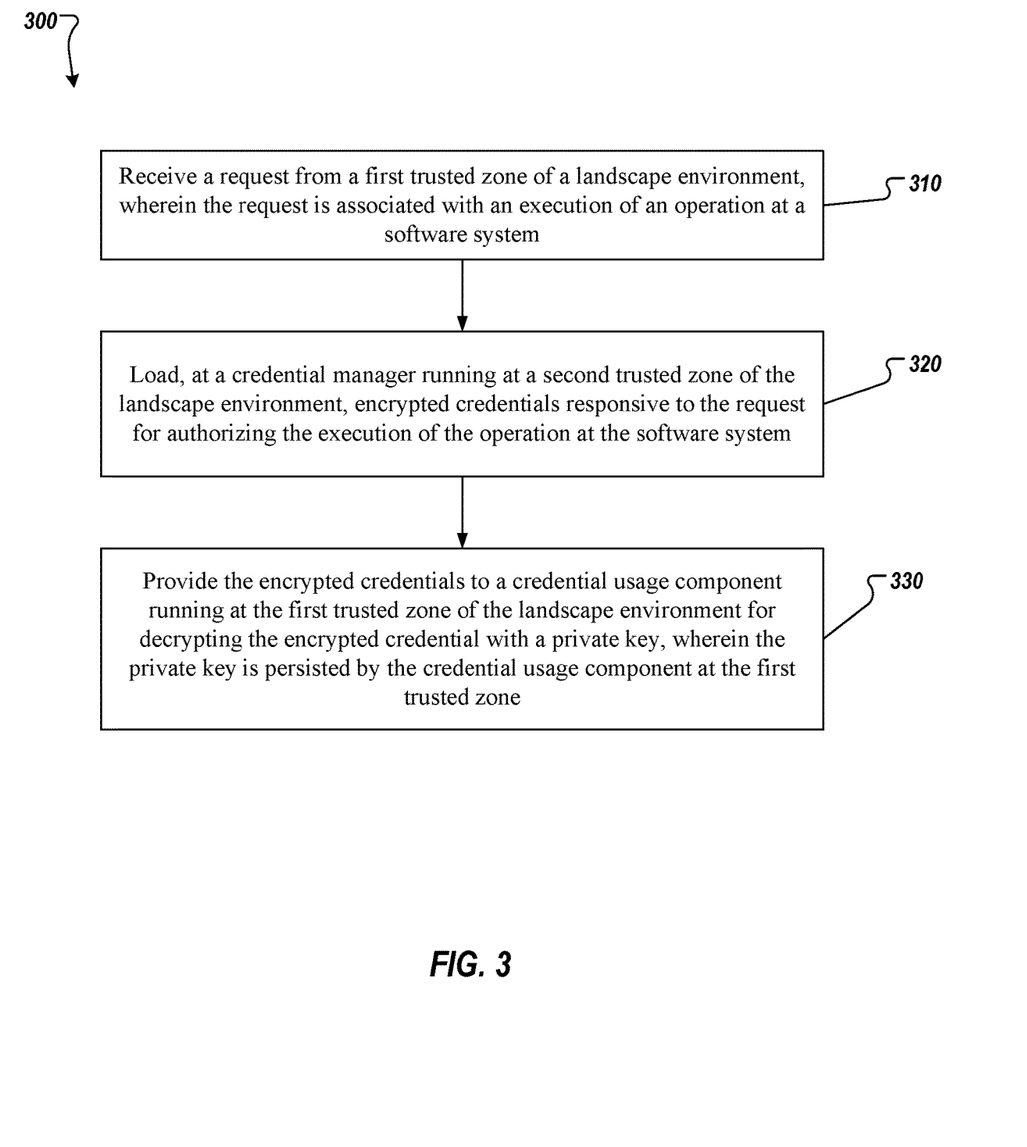
FIG. 3 is a block diagram for an example method for credential management in accordance with implementations of the present disclosure.

FIG. 3 is a block diagram for an example method 300 for credential management in accordance with implementations of the present disclosure. The example method 300 can be implemented, in some examples, at the landscape environment 200 and can be performed by the cloud landscape manager 240 of FIG. 2. The example method 300 can be implemented at a credential manager (or a landscape management tool as previously discussed) that provides services for secure management of credentials for authorization of requested operations at a managed system by a user associated with the managed system (e.g., of a given account, group, or user role, among others). In some instances, a user may request, through the credential manager, to execute an operation at a managed system. The execution of the operation may be associated with authentication requirements and credential authentication.

At 310, a request associated with an execution of an operation at a software system is received at a credential manager. In some instances, the credential manager can be deployed as part of a cloud landscape manager, such as illustrated by the cloud landscape manager 240 of FIG. 2.

In some instances, the credential manager can run as part of a cloud platform application to provide landscape management service for software systems including the software system. The software systems can run on cloud platform infrastructure at the first trust zone of the landscape environment. The software systems can be similar, for example, to the managed systems 260 of FIG. 2.

The received request can be received via a web application, a browser, a desktop application, or a native application, among other examples of application that can be used to transmit a request for execution of an operation. In some instances, the request can be received through the UT/Browser 235 of FIG. 3. The request can be received from a first trust zone that is managed by the customer associated with the software system. Further, the request can be initiated by a user or a group of user, or can be based on a schedule for executing a request implemented at an application. Other suitable examples of how to initiate a request in automatic or manual manner may be used.

In some instances, the received request can be received from a UI application or browser connected to a customer network of a customer associated with a system that is running at a landscape environment that is managed by the cloud landscape manager. The received request can be a request to execute a managing operation that is to be authenticated prior execution at the software system.

In some instances, the received request is received from a user (e.g., end user 230 of FIG. 2) authorized to execute the operation at the software system. The received request identifies the software system by referencing at least one of a system name or network address.

At 320, encrypted credentials responsive to the request are loaded at a credential manager running at a second trust zone of the landscape environment. The encrypted credentials may be used to authorize execution of the operation. In some instances, the encrypted credentials can be directly persisted with other information related to the software system (e.g., system name, IP address, or other suitable information). The credential manager can keep a reference to the public key as an encryption key. In some instances, the public key can be used for further encryption, for example, based on a certificate fingerprint.

In some other instances, the credential manager loads the encrypted credentials by querying and invoking the encrypted credentials from a storage. The encrypted credentials can be persisted at a storage, and can be a protected version of credentials that are encrypted with a public key of a customer associated with the request received at 310. In some instances, the public key can be associated with the credentials for the user for the software systems. The encrypted credentials can be invoked based on an identification of the system where the operation is requested for execution.

At 330, the encrypted credentials are provided by the credential manager to a credential usage component running at the first trust zone of the landscape environment for decrypting the encrypted credential with a private key. The credential usage component can be a component implementing logic to process received requests associated with one or more managed systems and invoke execution of actions (based on the received requests) at the one or more managed systems. The private key is persisted by the credential usage component and the private key and the public key can form an asymmetric key pair generated for authorizing requests for execution at the software system. The key pair can be generated at the first trust zone as a dedicated key pair for particular credentials associated with the software systems. In some instances, the key pair can be associated with an account related to one or more managed systems, and one or more users can be associated with the account.

In some instances, the credential manager and the credential usage component can run at separate isolated cloud platforms.

In some instances, the encrypted credentials are decrypted at the credential usage components responsive to receiving the encrypted credentials from the credential manager.

In some instances, the decrypted credentials are provided by the credential usage component to the software system to authenticate an identity of a user that is associated with the request. In some instances, the decryption can be performed upon receiving the encrypted credentials, and the decryption can be performed based on a pre-stored private key. In some instances, the private key and the public key are an asymmetric key pair generated for authorizing requests for execution at the software system. The private and the public key can be stored at separate entities to support improved security when executing operations at managed systems through a landscape management solution.

In some instances, the encrypted credentials are decrypted at the credential usage components in response to those components receiving the encrypted credentials from the credential manager. In some instances, the credential usage component successfully decrypts the encrypted credentials when the private key matches the public key references by the encrypted credentials. The decrypted credentials can be provided by the credential usage component to the software system to authenticate an identity of a user that is associated with the request.

In some instances, the encrypted credentials are decrypted at the credential usage component on demand and in response to receiving the encrypted credential. In some instances, after the decryption, a request to execute the operation at the software system is. The transmitted request includes decrypted credentials for authorization of the execution of the operation. The credential usage component may or may not persist the decrypted version of the credentials.

Figure 4:
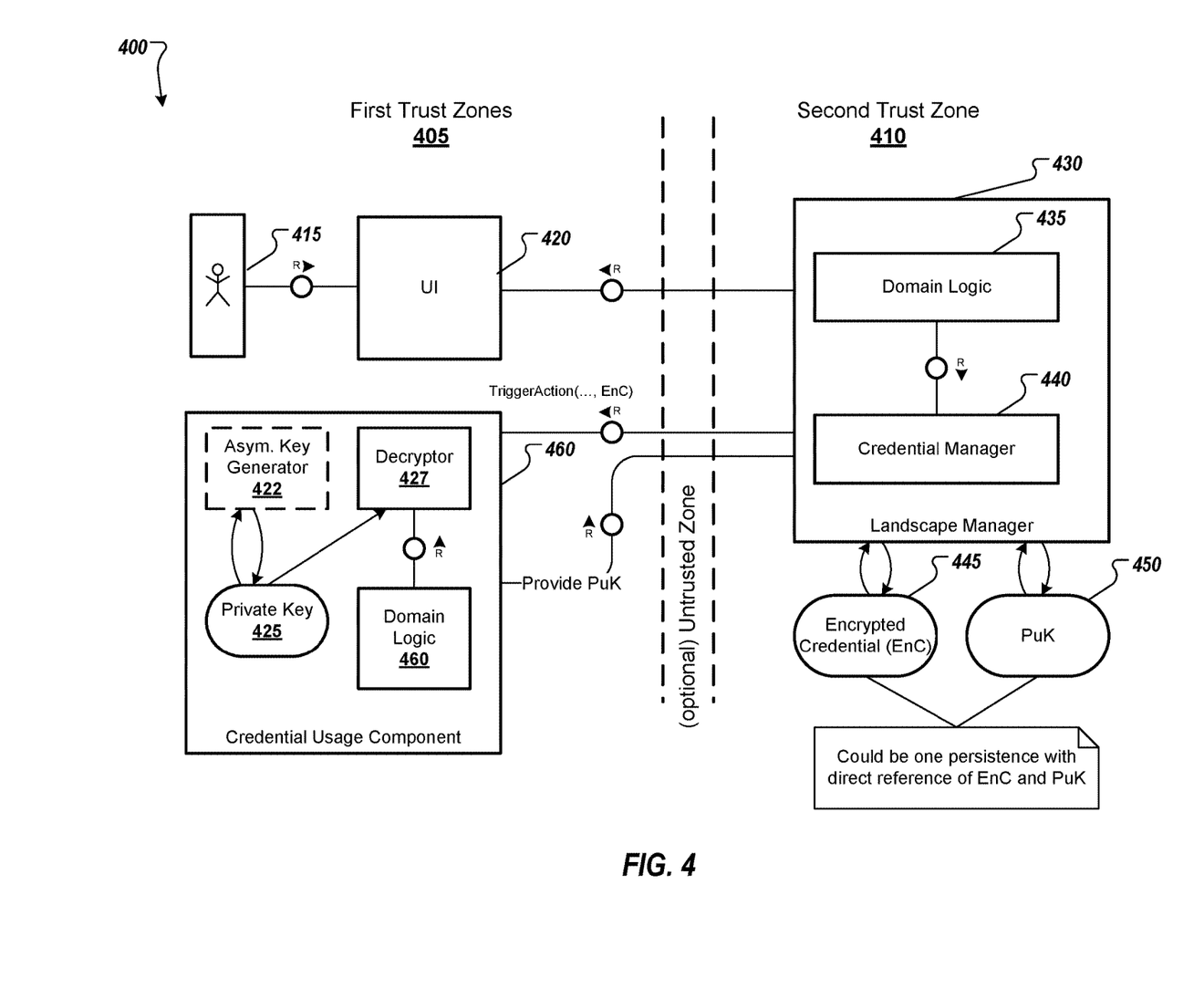
FIG. 4 is a system diagram for an example landscape environment including a credential manager and a credential usage component for secure persistence of credentials for authentication of requests at managed systems in accordance with implementations of the present disclosure.

FIG. 4 is a system diagram for an example landscape environment 400 including a credential manager and a credential usage component for secure persistence of credentials for authentication of requests at managed systems in accordance with implementations of the present disclosure.

In some instances, the landscape environment 400 includes a first trust zone 405 and second trust zones 410. In some instances, trust zones can be defined as network areas of the landscape that are considered as secure areas for communication between entities. Multiple trust zones can be considered as a single group where communication between entities may not be monitored and filtered through a firewall. In some instances, communication between a trust zone and another trust zone, or a group of trust zones and another group of trust zones can be performed according to secure requirements for exchange of requests and resources between different networks.

In some instances, between the first trust zones 405 and the second trust zones 410 there may be an untrusted zone where at least some of the requests between the first and the second trust zones are transmitted through the untrusted zone. Communication handled with entities running in an untrusted zone can be handled according to defined security rules for incoming and outgoing network traffic.

In some instances, the first trust zone 405 includes platform infrastructure for hosting and running a UI application 420 and a credential usage component 460 to support receiving of requests for executing operations at software systems managed by a customer. As an example, the UI application 420 can be similar to the UI/Browser 235 of FIG. 2, and the credential usage component 460 can be similar to the execution engine 245 of FIG. 2. In some instances, the execution engine 245 can be hosted at the same cloud platform where one or more of the managed software systems are hosted.

In some instances, the second trust zone 410 includes a landscape manager 430 that is a landscape management tool, for example, a landscape management cloud application. As an example, he landscape manager 430 can be similar to the cloud landscape manager 240 of FIG. 2. The landscape manager 430 includes a credential manager 440 (e.g., the credential manager discussed at FIG. 3) and domain logic 435 for processing requests for operation execution in relation to landscape management of managed systems of the customer (e.g., systems hosted at the first trust zone 405).

In some instances, at the first trust zone 405, the UI 420 is a component that provides access to the end user 415 to enter a set of credentials to be persisted at the landscape manager 430 and used by the credential usage component 460 to authorize execution of a requested operation at a managed system by the landscape manager 430. In some instances, the UI 420 includes logic to receive information from the end user 415 that includes credentials for a particular software system that is managed by the landscape manager 430. The UI 420 can encrypt the credentials according to an encryption scheme and provide it to the landscape manager 430. The encrypted credentials 445 can include additional verification(s) that can be used to determine authenticity of the encrypted credentials 445 when they are later evaluated. For example, the encryption can be performed with checksums, signatures, and valid dates, among other examples.

In some instances, the landscape manager 430 can directly communicate with the UI 420. The landscape manager 430 includes actual domain logic 435 how to manage a system running at an underlying infrastructure (e.g., private cloud IaaS) and a credential manager 440. The credential manager 440 includes logic to persist received encrypted credentials 445 from the UI 420 in association with a managed system. In some instances, the encrypted credential 445 can be directly persisted together with other non-confidential information related to the credentials. For example, the encrypted credentials 445 can be persisted together with information including, but not limited to a system name, a Virtual Machine names where the system is hosted, IP address of the system, DNS names, certificates, and/or user account information (e.g., user password, user identifier, user role), among other suitable information.

In some instances, the credential manager 440 can receive a public key from a credential usage component running at the first trust zone 405. In some instances, a single public key may be associated with multiple credentials associated with multiple systems and one or more customer. In some other cases, each credential can be encrypted with a separate different public key. In some instances, the landscape manager 430 can maintain a reference of the encrypted credentials 445 to a public key 450 used for that credential's encryption. In some instances, the public key can be used for further encryption performed by the landscape manager 430.

In some instances, a private key 425 can be used to encrypt the credentials and the public key 450 that can decrypt the credentials can form an asymmetric key pair generated by an asymmetric key generator 422. In some instances, the asymmetric key generator 422 can be configured as part of the credential usage component 460. In some other instances, the asymmetric key generator 422 may be an external component where the key transfer to the credential usage component and the landscape manager respectively can be done automatically over a network, through inter process communication, and by user manual activities (e.g., uploading a certificate), among other examples of data transfer.

In some instances, the credential manager 440 can receive a request to execute an operation related to a first managed system from the UI 420. Upon receiving the request, the credential manager 440 can load a responsive set of encrypted credentials 445 for the received request and trigger action(s) for requesting an execution of the operation at the first managed system by the credential usage component 460. In some instances, triggering an action to request execution of an operation by the credential usage component 460 may include providing the loaded encrypted credentials 445 from the credential manager 440 to the credential usage component 460. In some instances, the triggering request to perform an action ca be based on domain logic part of the domain logic 435 associated with the first managed system.

In some instances, in response to triggering an action for executing the operation at the first managed system by the credential manager 440, the credential usage component 460 can retrieve the received request to execute the domain logic provided with the triggered action and the encrypted credentials 445 (e.g., provided as payload of the triggering request). The credential usage component 460 can include a decryptor 427 that can use the internally persisted private key 425 for decryption of the encrypted credentials 445 provided by the credential manager.

Figure 5:
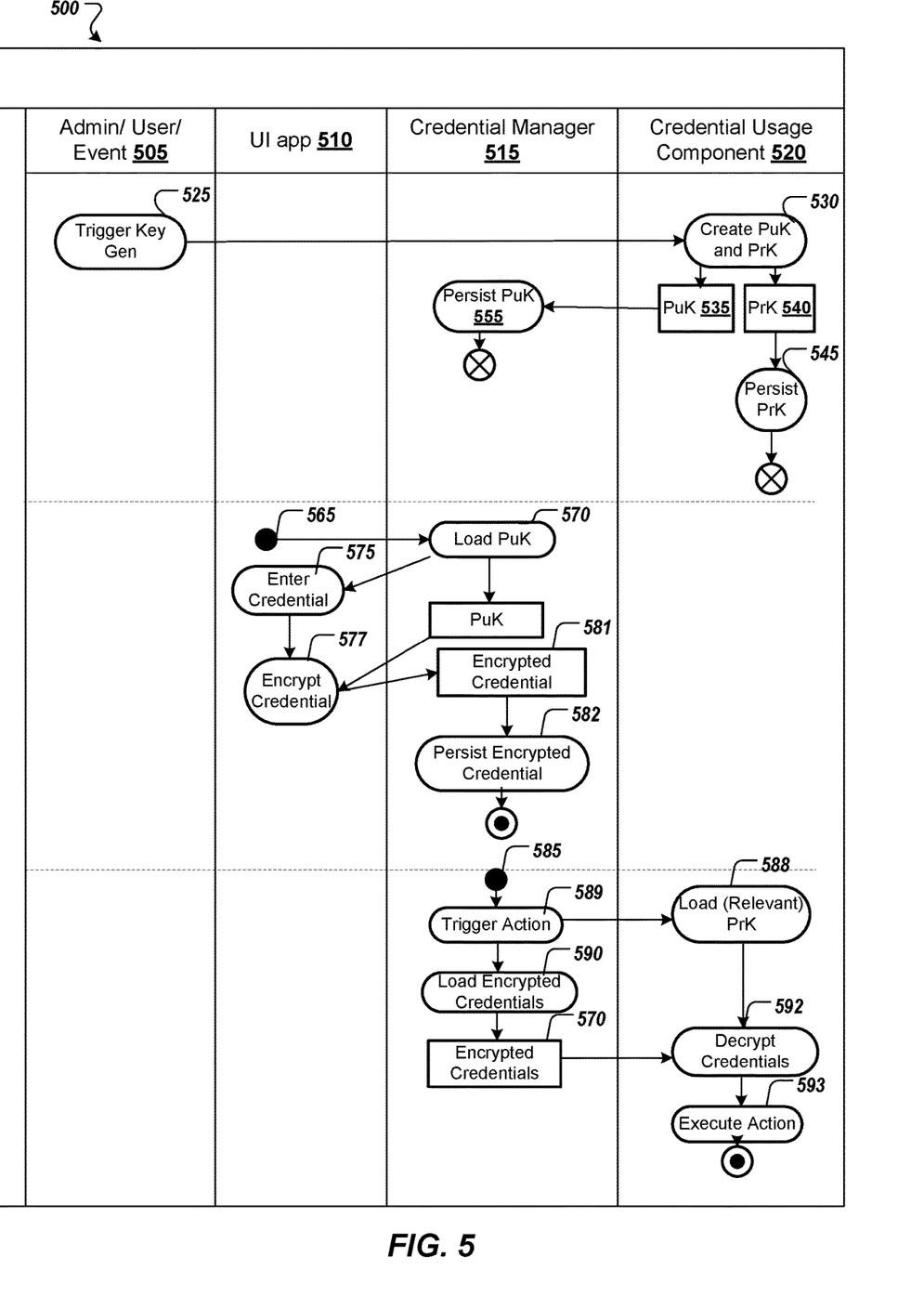
FIG. 5 is a sequence diagram for an example method for configuring, persisting, and using credentials for authentication of requests related to a managed system in accordance with implementations of the present disclosure.

FIG. 5 is a sequence diagram for an example method 500 for configuring, persisting, and using credentials for authentication of requests related to a managed system in accordance with implementations of the present disclosure. In some instances, the method 500 can be implemented at the landscape environment 200 of FIG. 2, the landscape environment 400 of FIG. 4, or any other suitable system or environment. As illustrated, the example method 500 can be implemented in association with a UI application 510 (e.g., similar to or different from the UI 235 of FIG. 2 or UI 420 of FIG. 4), a credential manager 515 (e.g., similar to or different from the credential manager and landscape manager discussed throughout the application and in relation to FIGS. 2, 3, and 4), and a credential usage component 520 (e.g., similar to or different from the execution engine 245 of FIG. 2 or the credential usage component 460 of FIG. 4).

In some instances, the example method 500 includes operations to configure the credential manager and the credential usage component to provide secure execution of landscape management operations requested by a user at a landscape management tool for execution at managed systems. The execution of method 500 can be performed in accordance with the described method for execution of operations by authenticating the operation based on credentials provided in encrypted form by a credential manager and decrypted by a credential usage component. The method 500 can be executed in connection with the credential manager 515 and the credential usage component 520 as they are hosted and run at different trust zones of a landscape environment.

In some instances, the method 500 includes operations associated with setting up encryption and decryption keys for protecting credentials associated with managed systems, configuring the credential manager 515 and the credential usage component 520 for secure exchange of protected information to authorize a request for execution of an action(s) at the managed systems, and processing a request to execute an operation, where the request is received at a landscape manager, for execution of the operation at a managed system based on execution handled by a credential usage component running at the same trust zone as the managed system.

In some instances, the credential manager 515 and the credential usage component 520 are configured to store key information for encrypting and decrypting confidential information. The credential manager 515 stores a key for encrypting confidential information, and the credential usage component 520 stores a key for decrypting confidential information associated with the key used for encryption. In some instances, the credential information includes credentials for authentication at a managed system associated with the credential manager 515. The credentials can be similar to the credentials discussed in FIGS. 2-4, although any suitable credential may be used.

In some instances, a key generation triggering action 525 is initiated to trigger generation of a key pair including a public and a private key. In some instances, the triggered action can be initiated manually by a user (e.g., an administrator, and a user of a particular role, among other examples) or automatically (e.g., based on a scheduled event). At 530, the key pair is provided to the credential usage component 520. The key pair includes a private key (PrK) 540 and a public key (PuK) 535. The credential usage component 520 can persist the private key 545. At 555, the credential usage component 520 provides the public key 535 to the credential manager 515 to be persisted.

At 570, a request is received at the credential managed 515 to load a public key, and to use the public key to encrypt (at 575) credentials that are entered by a user through the UI application 510. At 557, the credentials are encrypted at the UI application and are provided, at 581, to the credential manager 515. At 582, the credential manager 515 persists the encrypted credentials.

At 585, an request to trigger execution of an operation (or action) at a managed system is received at the credential manager 515. In some instances, the received request can be similar to the received request at 310 of FIG. 3. In some instances, the request is received from a user and is provided through the UI application 510. In some other instances, the triggered execution of the operation can be automatically invoked. For example, the triggered operation at 585 may be performed in accordance with a schedule for execution of operations related to a managed system associated with the credential manager.

At 588, in response to the triggered action, the credential manager 515 sends a request to the credential usage component 520 to load a relevant private key responsive to the requested operation for execution. At 589, the credential manager 515 loads encrypted credentials corresponding to the triggered action, and, at 590, provides the encrypted credentials to the credential usage component 520.

At 592, the credential usage component decrypts the encrypted credentials based on the loaded relevant private key (at 588), and provides the decrypted credentials for requesting execution of the operation at 593. The credential usage component 520 sends the request to execute the operation at 593 to the managed system.

Figure 6:
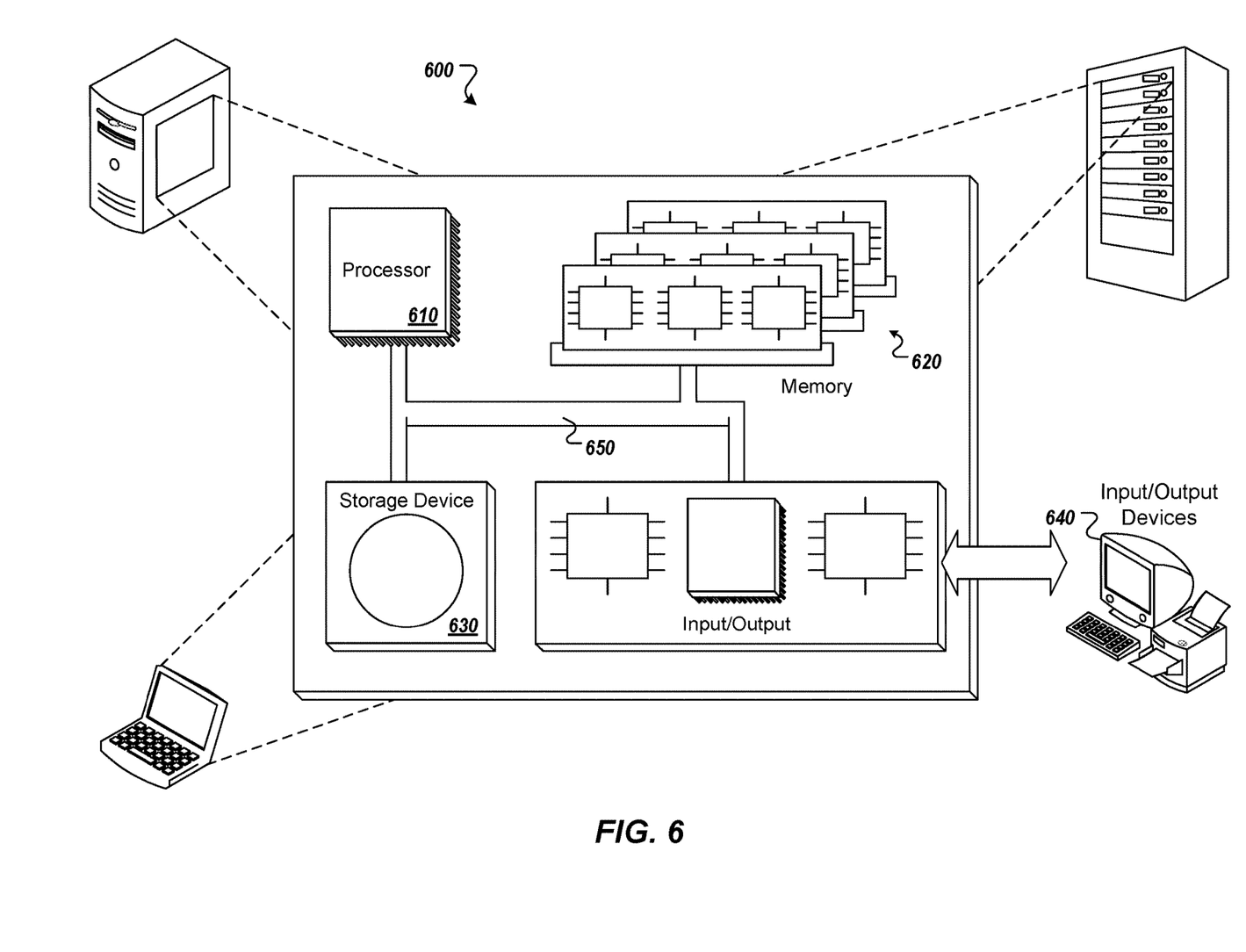
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, and 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method for credential management, the method being executed by one or more processors, wherein the method comprises:
receiving a request associated with an authentication of a requestor at a landscape environment; and
in response to receiving the request:
loading, at a credential manager running at the landscape environment, encrypted credentials responsive to the request, wherein the encrypted credentials are persisted at a storage by the credential manager, wherein the encrypted credentials include credentials that are encrypted with a public key and are provided in encrypted form to the credential manager for use when requesting authentication at the landscape environment; and
providing the encrypted credentials to a credential usage component running at the landscape environment for decrypting the encrypted credential with a private key, wherein the private key is persisted by the credential usage component at the landscape environment, and wherein the private key and the public key are an asymmetric key pair for authorizing requests.

Example 2. The method of Example 1, wherein the request is associated with the authentication of the requestor for executing an operation at a software system, wherein the request is received at a first trust zone of the landscape environment and the software system is running at a second trust zone of the landscape environment.

Example 3. The method of Example 1, wherein the request is associated with the authentication of the requestor for executing an operation at a software system, wherein the credential usage component run at a first trust zone of the landscape environment, and wherein the credential manager runs at a second trust zone of the landscape environment that is separate from the first trust zone.

Example 4. The method of Example 3, wherein the software system runs at the first trust zone of the landscape environment.

Example 5. The method of any one of Examples 1 to 4, wherein the encrypted credentials are decrypted at the credential usage components responsive to receiving the encrypted credentials from the credential manager, and wherein the decrypted credentials are provided by the credential usage component to a software system to authenticate an identity of the requestor.

Example 6. The method of any one of Examples 1 to 5, further comprising:
in response to receiving the encrypted credential at the credential usage component, decrypting the encrypted credential with the private key; and
transmitting a request to execute an operation at a software system, wherein the transmitted request includes decrypted credentials for authorization of an execution of an operation associated with the received request for authentication.

Example 7. The method of any one of Examples 1 to 6, wherein the requestor is authorized to execute an operation at a software system, and wherein the received request identifies the software system by referencing an internal identifier as a target context for performing authentication of the encrypted credentials.

Example 8. The method of any one of Examples 1 to 7, wherein the credential manager is running as part of a cloud platform application to provide landscape management service for software systems, wherein the software systems run on cloud platform infrastructure at a first trust zone of the landscape environment.

Example 9. The method of any one of Examples 1 to 8, wherein the credential manager and the credential usage component are running at separate isolated cloud platforms.

Example 10. The method of any one of Examples 1 to 9, further comprising:
receiving instructions, at a user interface associated with the credential manager, to create the key pair including the public key and the private key; and in response to the received instructions, configuring the credential manager and the credential usage component to persist the public key and the private key correspondingly, wherein configuring comprises:
    providing the public key to be persisted by the credential manager; and
    providing the private key to be persistent at the credential usage component.

Example 11. The method of any one of Examples 1 to 10, wherein the key pair is associated with an account related to one or more managed systems, and wherein one or more users are associated with the account.

Example 12. The method of any one of Examples 1 to 10, further comprising:
    receiving, at a user interface associated with the credential manager, credentials provided by a user for accessing a software system from a plurality of systems associated with the credential manager;
    encrypting, at the user interface, the received credentials by using the private key that is persisted at the credential usage component; and
    providing the encrypted credentials to an cloud landscape manager for persisting the encrypted credential, wherein the cloud platform manager includes the credential manager and domain specific logic for configuring, managing, and persisting a platform landscape configuration for a platform landscape environment, wherein the platform landscape environment include software systems and is associated with one or more customer accounts, and wherein each customer account is associated with different credentials authorizing access to at least one of the software systems.

What is claimed is:

1. A computer-implemented method for credential management, the method being executed by one or more processors, wherein the method comprises:
    receiving, by a credential manager running at a first network segment of network segment of a landscape environment, a request associated with an authentication of a requestor system at the landscape environment, the landscape environment including the network segments managed by different entities, wherein the request is for authentication of the requestor system at a software system running at a second network segment, wherein the second network segment provides cloud platform resources for hosting and running software systems associated with the requestor system; and
    in response to receiving the request:
        obtaining, by the credential manager running at the first network segment of the network segments of the landscape environment, encrypted credentials from a storage accessible by the credential manager at the first network segment, wherein the encrypted credentials are encrypted with a public key and are provided in encrypted form to the credential manager for providing to a credential usage component; and
        triggering, by the credential manager, an operation for execution by the credential usage component running at a third network segment of the landscape environment, wherein the operation is for executing an action at the software system running at the second network segment, the action requiring authentication based on decrypted credentials, wherein the operation is triggered based on domain logic associated with the requestor system as stored by the credential manager, and wherein triggering the operation comprises:
            providing, by the credential manager, the encrypted credentials to the credential usage component, wherein the encrypted credentials are decryptable with a private key at the third network segment by the credential usage component, wherein the private key is obtainable by the credential usage component from a third key storage persisted at the credential usage component in the third network segment, and wherein the private key and the public key are an asymmetric key pair.

2. The method of claim 1, wherein the encrypted credentials are decrypted at the credential usage component responsive to receiving the encrypted credentials from the credential manager, and wherein the decrypted credentials are provided by the credential usage component to the software system to authenticate an identity of the requestor system.

3. The method of claim 1, wherein triggering, by the credential manager, the operation for execution by the credential usage component further comprising:
    in response to receiving the encrypted credential at the credential usage component, decrypting the encrypted credential with the private key; and
    transmitting, by the credential usage component and based on the triggering, a request to execute an action at a software system according to the triggered operation according to the domain logic by the credential manager, wherein the transmitted request includes decrypted credentials for authorization of an execution of the operation.

4. The method of claim 1, wherein the requestor system is authorized to execute the action at the software system, and wherein the received request identifies the software system by referencing an internal identifier of the software system to for requesting authentication of the software system.

5. The method of claim 1, wherein the credential manager is running as part of a cloud platform application to provide landscape management service for software systems, wherein the software systems run on a cloud platform infrastructure at the third network segment of the landscape environment.

6. The method of claim 1, wherein the credential manager and the credential usage component are running at separate isolated cloud platforms.

7. The method of claim 1, further comprising:
    receiving instructions, at a user interface associated with the credential manager, to create a key pair including the public key and the private key; and
    in response to the received instructions, configuring the credential manager and the credential usage component to persist the public key and the private key correspondingly, wherein configuring comprises:
        providing the public key to be persisted by the credential manager; and
        providing the private key to be persistent at the credential usage component.

8. The method of claim 1, further comprising:
    receiving, at a user interface associated with the credential manager, credentials provided by a user for accessing a software system from a plurality of systems associated with the credential manager;
    encrypting, at the user interface, the received credentials by using the private key that is persisted at the credential usage component; and
    providing the encrypted credentials to a cloud landscape manager for persisting the encrypted credential, wherein the cloud landscape manager includes the credential manager and domain specific logic for configuring, managing, and persisting a platform landscape configuration for a platform landscape environment, wherein the platform landscape environment include software systems and is associated with one or more customer accounts, and wherein each customer account is associated with different credentials authorizing access to at least one of the software systems.

9. A non-transitory, computer-readable medium coupled to one or more processors and having instructions stored thereon which, when executed by the one or more processors, cause the one or more processors to perform operations, the operations comprising:

receiving, by a credential manager running at a first network segment of network segment of a landscape environment, a request associated with an authentication of a requestor system at the landscape environment, the landscape environment including the network segments managed by different entities, wherein the request is for authentication of the requestor system at a software system running at a second network segment, wherein the second network segment provides cloud platform resources for hosting and running software systems associated with the requestor system; and in response to receiving the request:
obtaining, by the credential manager running at the first network segment of the network segments of the landscape environment, encrypted credentials from a storage accessible by the credential manager at the first network segment, wherein the encrypted credentials are encrypted with a public key and are provided in encrypted form to the credential manager for providing to a credential usage component; and
triggering, by the credential manager, an operation for execution by the credential usage component running at a third network segment of the landscape environment, wherein the operation is for executing an action at the software system running at the second network segment, the action requiring authentication based on decrypted credentials, wherein the operation is triggered based on domain logic associated with the requestor system as stored by the credential manager, and wherein triggering the operation comprises:
providing, by the credential manager, the encrypted credentials to the credential usage component, wherein the encrypted credentials are decryptable with a private key at the third network segment by the credential usage component, wherein the private key is obtainable by the credential usage component from a third key storage persisted at the credential usage component in the third network segment, and wherein the private key and the public key are an asymmetric key pair.

10. The computer-readable medium of claim 9, wherein the encrypted credentials are decrypted at the credential usage component responsive to receiving the encrypted credentials from the credential manager, and wherein the decrypted credentials are provided by the credential usage component to the software system to authenticate an identity of the requestor system.

11. The computer-readable medium of claim 9, wherein triggering, by the credential manager, the operation for execution by the credential usage component further comprising:
in response to receiving the encrypted credential at the credential usage component, decrypting the encrypted credential with the private key; and
transmitting, by the credential usage component and based on the triggering, a request to execute an action at a software system according to the triggered operation according to the domain logic by the credential manager, wherein the transmitted request includes decrypted credentials for authorization of an execution of the operation.

12. The computer-readable medium of claim 9, wherein the requestor system is authorized to execute the action at the software system, and wherein the received request identifies the software system by referencing an internal identifier of the software system to for requesting authentication of the software system.

13. The computer-readable medium of claim 9, wherein the credential manager is running as part of a cloud platform application to provide landscape management service for software systems, wherein the software systems run on a cloud platform infrastructure at the third network segment of the landscape environment.

14. The computer-readable medium of claim 9, wherein the credential manager and the credential usage component are running at separate isolated cloud platforms.

15. A system comprising:
a computing device; and
a computer-readable storage device coupled to the computing device and having instructions stored thereon which, when executed by the computing device, cause the computing device to perform operations, the operations comprising:
receiving, by a credential manager running at a first network segment of network segment of a landscape environment, a request associated with an authentication of a requestor system at the landscape environment, the landscape environment including the network segments managed by different entities, wherein the request is for authentication of the requestor system at a software system running at a second network segment, wherein the second network segment provides cloud platform resources for hosting and running software systems associated with the requestor system; and
in response to receiving the request:
obtaining, by the credential manager running at the first network segment of the network segments of the landscape environment, encrypted credentials from a storage accessible by the credential manager at the first network segment, wherein the encrypted credentials are encrypted with a public key and are provided in encrypted form to the credential manager for providing to a credential usage component; and
triggering, by the credential manager, an operation for execution by the credential usage component running at a third network segment of the landscape environment, wherein the operation is for executing an action at the software system running at the second network segment, the action requiring authentication based on decrypted credentials, wherein the operation is triggered based on domain logic associated with the requestor system as stored by the credential manager, and wherein triggering the operation comprises:
providing, by the credential manager, the encrypted credentials to the credential usage component, wherein the encrypted credentials are decryptable with a private key at the third network segment by the credential usage component, wherein the private key is obtainable by the credential usage component from a third key storage persisted at the credential usage component in the third network segment, and wherein the private key and the public key are an asymmetric key pair.

16. The system of claim 15, wherein the requestor system is authorized to execute the action at the software system, and wherein the received request identifies the software system by referencing an internal identifier of the software system to for requesting authentication of the software system.

17. The system of claim 15, wherein the credential manager is running as part of a cloud platform application to provide landscape management service for software systems, wherein the software systems run on a cloud platform infrastructure at the third network segment of the landscape environment.

18. The system of claim 15, wherein the credential manager and the credential usage component are running at separate isolated cloud platforms.

\* \* \* \* \*